United States Patent [19]

Haller

[11] 3,982,131
[45] Sept. 21, 1976

[54] NEUTRON DETECTOR CABLE MONITORING

[75] Inventor: Pierre Haller, Erlangen, Germany

[73] Assignee: Kraftwerk Union Aktiengesellschaft, Mulheim, Germany

[22] Filed: Aug. 13, 1975

[21] Appl. No.: 604,115

[30] Foreign Application Priority Data

Aug. 20, 1974 Germany............................ 2439954

[52] U.S. Cl. ................................................ 250/390
[51] Int. Cl.² ............................................ G01T 3/00
[58] Field of Search..................... 250/390, 391, 392

[56] References Cited
UNITED STATES PATENTS 3,903,420   9/1975   Klar ................................... 250/390
3,904,881   9/1975   Klar et al. ........................... 250/390

*Primary Examiner*—Davis L. Willis
*Attorney, Agent, or Firm*—Kenyon & Kenyon Reilly Carr & Chapin

[57] ABSTRACT

In a neutron detector connected by a cable with a current amplifier for the signal based on (n,e)-processes, any change in the insulation resistance of the cable is monitored by means of an a-c voltage which is superimposed on the offset voltage of the amplifier. The resistance-dependent a-c variable at the output of the amplifier, is used to make a limit indicator respond via a connected filter. The invention is of importance particularly for monitoring the internal core instrumentation of pressurized-water reactors.

4 Claims, 5 Drawing Figures

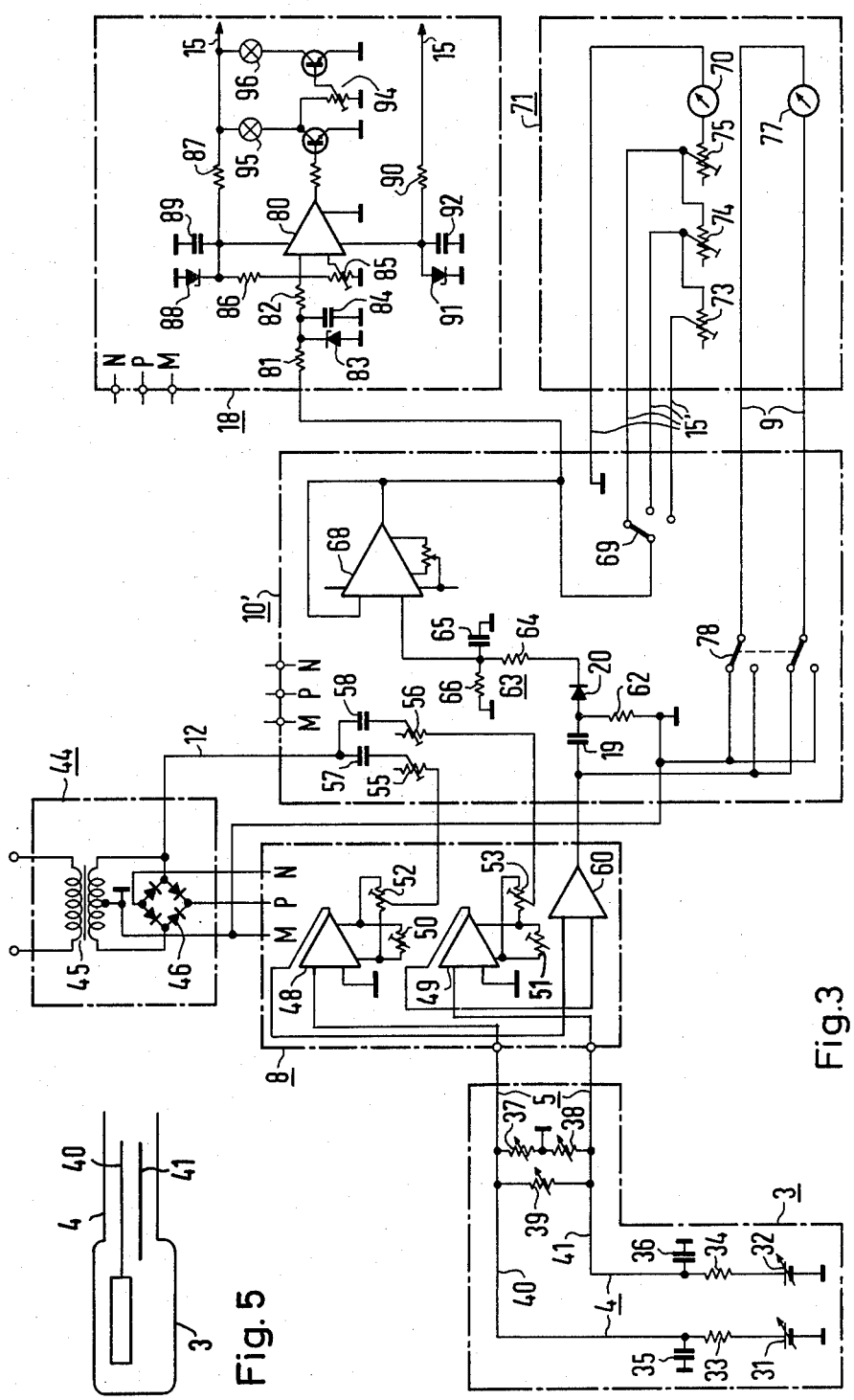

NEUTRON DETECTOR CABLE MONITORING

BACKGROUND OF THE INVENTION

This invention concerns a neutron detector having a current amplifier for the signal which is based on (n,e)-processes. Such detectors, which may have, for instance, cobalt or thulium as the activatable emitter material and are provided with a concentric collector of Inconel, are employed particularly in the so-called "internal core instrumentation" of pressurized-water reactors. Among other things, they serve to monitor the neutron flux density in the core, so that, for instance, in the event of unusual flux changes, a scram action can be initiated for the nuclear reactor. In this context, they therefore constitute an important member of the reactor safety system. From this, it follows that the reliability of such neutron detectors should be monitored.

As the current of a neutron detector proportional to the neutron flux is only fractions of a microampere, each signal must be processed in a current amplifier for subsequent evaluation. The amplifier is connected with the neutron detector, i.e., with its emitter and collector, via cables which lead into the interior of the reactor pressure vessel. These cables are subjected to high temperatures, high pressures and, in addition, to radiation influences. Their insulation resistance can suffer from this, whereby the signal of the neutron detector is falsified.

While it is theoretically possible to ascertain the internal resistance of the cables by means of an ohmmeter, each cable must be disconnected from its detector for this purpose, and connected to the ohmmeter. This results not only in an interruption in the operation of the reactor, but also in generally undesirable costs. In view of the high desired insulation resistance, it is furthermore difficult to ascertain when the small tolerable insulation changes are reached. This invention, therefore, seeks a new approach to ensure the reliability of the measurements obtained with the neutron detectors.

SUMMARY OF THE INVENTION

According to the invention, the input offset voltage of the current amplifier is modulated with a low-frequency a-c voltage, and a filter which feeds a limit indicator is associated with the output of the operational amplifier.

In current amplifiers, the input offset voltage is caused, as is well known, by the unavoidable asymmetries in the interior of the amplifier. Involved here is a d-c voltage with a typical value of, say, 1 mV, which can be balanced to zero by means of a potentiometer. If, in accordance with this invention, a low-frequency a-c voltage is superimposed on the offset voltage, the insulation resistance, which co-determines the output signal, of the cable and the neutron detector connected to the input of the current amplifier, can be measured thereby. The modulation has no effect, however, on the measurement of the current proportional to the neutron flux as long as the insulation resistance is normal, as the a-c voltage appears at the output of the amplifier only when the insulation resistance has dropped off. The monitoring of the insulation resistance can therefore take place continually and without interference with the normal operation.

The invention is preferably realized with a sinusoidal a-c voltage. For one, such voltages are easy to generate and transmit and, on the other hand, other voltage waveforms would contain components of higher frequency which are not necessary and are undesirable as the cable capacity represents a low impedance for high frequencies. Theoretically, however, it is also possible to operate with voltages similar to a sinusoidal voltage, e.g., with trapezoidal or triangular voltages whose fundamental is so large that the harmonics can practically be ignored.

As tests have shown, the a-c voltage may advantageously have a frequency between 10 and 100 Hz. One can therefore definitely use voltages with the common line frequencies of 50 or 60 Hz, which are available anywhere.

Although the supervision according to the invention operates with an a-c voltage, so that the signal that can be taken off at the output of the amplifier is likewise an a-c variable which can advantageously be differentiated easily from the d-c signal of the neutron flow, by means of a filter, a rectifier may be connected in series with a limit indicator for the a-c voltage supplied by the filter. The limit indicator can then be equipped with flipflops which can be controlled by d-c current or voltage, with Zener diodes, or the like.

One particularly advantageous embodiment of the invention is characterized by the feature that two current amplifiers are associated with a neutron detector having a cable providing an emitter line and a compensation line, in such a manner that any difference of the output signals is formed, and that the modulation voltages of the two amplifiers are of opposite phase. With such an arrangement, it is possible to monitor simultaneously the resistance of the emitter against chassis ground, the resistance of the compensation line against chassis ground and the resistance between the emitter and the compensation line including the measuring lines associated with the emitter, the compensation line and chassis.

BRIEF DESCRIPTION OF THE DRAWINGS

In the accompanying drawings, the various figures are as follows:

FIG. 3 diagrammatically shows an example of a system that has proven to be operative.

DETAILED DESCRIPTION OF THE INVENTION

Figure 1:
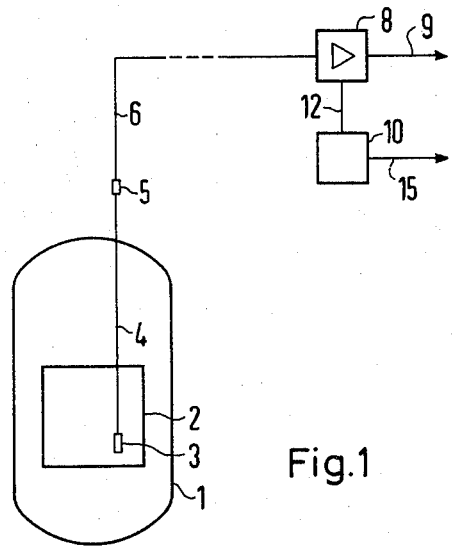
FIG. 1 schematically shows the principal of the invention as applied to a pressurized-water reactor.

In FIG. 1, the reactor pressure vessel of a pressurizedwater power reactor for, say, 1200 MWe, encloses a reactor core 2, which is composed, in a manner known per se, of fuel assemblies. There, so-called internal core instrumentation is arranged, by means of which particularly the neutron flux density inside the reactor core 2 is monitored. This purpose is served by a neutron detector 3, which may be, for instance, of the type described in the journal "Nuclear Engineering International," May, 1973, pages 421 to 425. The neutron detector 3 is connected with suitable evaluation equipments via a mineral-insulated cable 4. This has a metal sheath containing two conductors insulated from the sheath by mineral or ceramic material. The length of the mineral-insulated cable 4 up to the junction 5 outside the reactor pressure vessel 1, is about 10 m. At the junction 5, i.e., behind the tight feed-through through the wall of the reactor pressure vessel 1, a flexible cable 6 is connected, whose length is about 150 m. This cable leads to an amplifier 8, which delivers at the output 9 a signal usable for evaluation of the core's flux density.

The current amplifier 8 is provided with a monitoring unit 10. The latter supplies an a-c voltage superimposed on the offset voltage for the amplifier 8, of 24 V, 50 Hz, via the line 12 to one input of the amplifier 8. Depending on the magnitude of the insulation resistance of the neutron detector 3 including the cable 4 and flexible line 6, this voltage generates a fault signal that appears at an output line 15.

Figure 2:
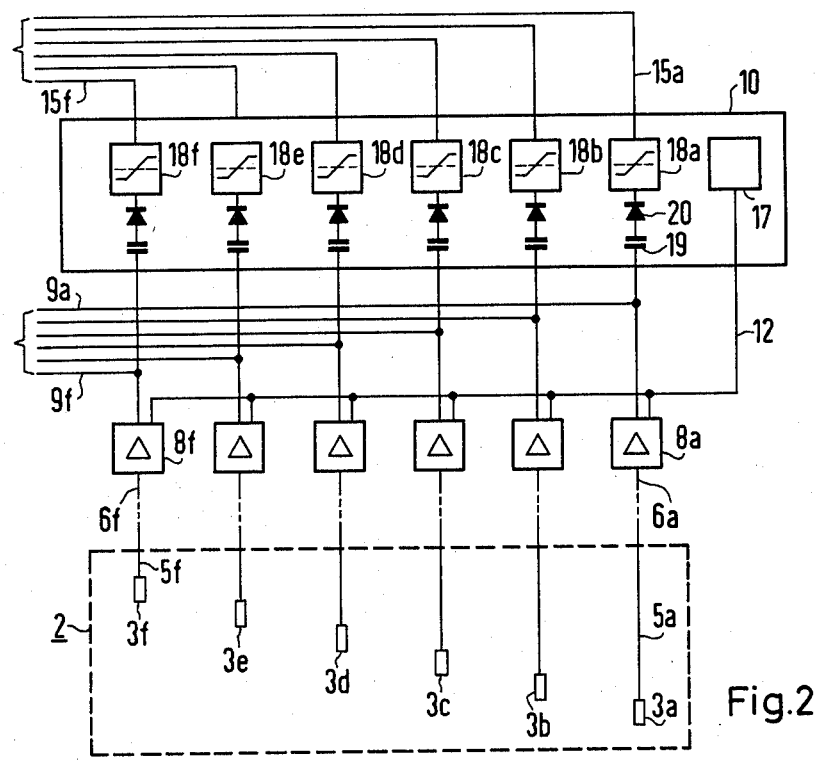
FIG. 2 diagrammatically shows the principal as applied in the case of a number of detectors such as would normally be distributed in a reactor core.

In FIG. 2 the reactor core 2 is indicated simplified by the borders shown by the dashed lines. In it, six probes $3a$, $3b$, $3c$, $3d$, $3e$, $3f$ are arranged, distributed over different height positions in the core 2. The probes, which allow a neutron flux measurement based on (n,e)-processes to be made, are connected via parallel-running, ceramically-insulated cables $5a$ to $5f$ and the flexible cables $6a$ to $6f$ which follow and are installed outside the reactor pressure vessel 1, connecting with the parallel amplifiers $8a$ to $8f$.

The amplifiers $8a$ to $8f$ are operational amplifiers connected as current amplifiers which supply, via the lines $9a$ to $9f$, the useful signals which corresponds to the neutron flux and are used in a suitable manner, e.g., to control the reactor power. On the operational amplifiers $8a$ to $8a$ is superimposed in parallel, via the line 12, a modulation voltage which is supplied by an oscillator 17 if a frequency, deviating from the normal line frequency, is desired. This supply maybe a sinusoidal a-c voltage of 40 Hz, and is superimposed on the offset voltage of the operational amplifiers. The monitoring unit 10 includes for each of the current amplifiers, limit indicators $18a$ to $18f$, each of which is connected via a capacitor 19 and a semiconductor rectifier 20. The capacitor 19 acts here as a filter. It takes care that the monitoring unit 10 does not have an adverse effect on the useful signal supplied as a d-c quantity, but is controlled only by a-c variables which indicate the insulation resistance.

The output of the limit indicators $18a$ to $18f$ can be used to give a fault alarm via the lines $15a$ to $15f$, in the case that the insulation resistance of a neutron detector $3a$ to $3f$ no longer has the desired high value. It should be noted in this connection that the input resistance of the current amplifiers is about $10^3$ ohm for the usual measuring range of $1 \times 10^{-6}$A. Thus, it is still possible to determine, without adverse effect on the measurement, changes of the insulation resistance of neutron detectors if the changes are in the range of $10^6$ ohm. With resistance values as high as this, the useful signal of the neutron detectors is practically still completely unfalsified. Thus, it is possible to monitor the operating reliability of the neutron detectors $3a$ to $3f$, making an undetected failure and errors in the control or supervision of the reactor core triggered thereby, impossible.

FIG. 3 shows in further detail a proven embodiment example of the invention in the case of a single neutron detector 3. The latter is represented in FIG. 3 by its equivalent circuit, in which also the cable 4 and the line 5 are included. The neutron detector 3 therefore includes one variable voltage source, connected to ground, each for the emitter, 31, and for a compensation line 32, which are connected with the cable 4 via a resistor 33, 34 of $10^7$ ohm in each instance. The capacity of the arrangement to chassis ground is indicated by the capacitors 35 and 36 of 10 nF each, while the insulating resistance of the emitter line 40 to ground, the compensation line 41 against ground, and between the emitter line 40 and the compensation line 41, which is important for the invention, is shown by the resistors 37, 38 and 39. Its value can drop from maximally about $10^9$ ohm to practically zero.

The amplifier 8 and the monitoring unit $10'$ following the former, with limit indicator 18 arranged outside the monitoring unit, are supplied from a power supply 44. Part of this is a transformer 45, which steps down the line voltage of 220 V, 50 Hz, for a rectifier 46, which supplies $\pm24$ V to supply the current amplifier 8, the monitoring unit $10'$ and the limit indicator 18. The transformer 45 also supplies the line 12 with a sinusoidal a-c voltage of 24 V, 50 Hz.

The difference-current amplifier, designated as a whole with 8, comprises in the embodiment example of FIG. 3 two equal, known operational amplifiers 48 and 49, which are used as current amplifiers and are indicated in simplified form, with an open-loop gain of $10^5$, of which the one is associated with the emitter line 40 and the other with the compensation line 41. The offset voltage of the operational amplifiers 48, 49 can be adjusted via potentiometers 50, 51 acting as variable resistors. Shunted across the potentiometers 50, 51 are two setting potentiometers 52, 53 of 200 kohm, via which the offset voltage of the operational amplifier 48, 49 is modulated with an a-c voltage. For this purpose, the center taps of the setting potentiometers 52, 53 are connected with the a-c line 12 via two series resistors 55, 56 of 1 megohm, and two capacitors 57, 58 of 1 microfarad, which are associated with the monitoring unit $10'$.

The outputs of the operational amplifiers 48, 49 are connected together in a difference amplifier 60 in such a manner that the difference of the output signals is formed. One thereby obtains, first, the measured value of the neutron detector 3 without any falsifying influence of the measuring lines, which is cancelled by means of the compensation line 41. On the other hand, the modulated voltages of the operational amplifiers 48, 49 appear with opposite phase due to the connection of the setting resistors 52, 53. Thus the influence of a possibly decreasing insulation resistance 37, for instance, of the emitter line 40 results as a positive quantity, that of the insulation resistance 38 of the compensation line 41 as a negative quantity, and that of the insulation resistance 39 as the scalar sum of the positive and negative quantities, these quantities, serving as fault signals, further being superimposed on the useful signal, i.e., the d-c quantity characterizing the neutron flux.

By means of the highpass filter, which is formed by the capacitor 19 with its capacity of 1 microfarad and a shunt resistor 62 of 10 kohm, the resultant modulated voltage is separated from the useful signal and rectified in the rectifier 20. The following lowpass filter 63 with a resistor 64 of 100 kohm and a capacitor 65 of 10 microfarad, which is shunted by a resistor 66 of 820 kohm, by smoothing the rectified signal, prevents a rapid change of the useful signal which might be interpreted as a fault signal.

The lowpass filter 63 feeds an impedance transformer 68. From the latter, the fault signal is fed to a measuring range switch 69 which is mounted in the monitoring unit $10'$ and allows the measurement of the voltage magnitude of the fault signal by means of a voltmeter 70 of a measuring device 71, in three measuring ranges. The measuring ranges are arranged for 0 to 1 V, 0 to 10 V and 0 to 20 V by means of the series resistors 73, 74 and 75 of 25, 10 and 5 kohm respectively.

The measuring device 71 contains a second voltmeter 77. With this, the useful signal, i.e., the magnitude of a voltage corresponding to the neutron flux, can be measured. A switch 78 which is associated with this voltmeter and which is mounted in the monitoring unit 10', permits the polarity of the voltmeter 77 to be reversed with respect to the output of the difference amplifier 60.

From the impedance transformer 68, the fault signal gets not only to the measuring range switch 69, but at the same time also to the limit indicator 18. The latter comprises a comparator 80, which is connected via the two resistors 81 and 82 of 10 kohm each, between which a Zener diode 83 and a capacitor 84 of 10 microfarad are connected to ground. The comparator 80 is further connected via a potentiometer 85 of 5 Kohm and a fixed resistor 86 of 10 Kohm with the one pole of the output line 15. Here, a Zener diode 88 shunted by a capacitor 89 of 0.68 microfarad to ground is provided ahead of a resistor 87 of 1 Kohm. The other pole of the output line 15 is likewise fed via a resistor 90 of 1 Kohm behind the parallel circuit to ground, consisting of a Zener diode 91 and a capacitor 92 of 0.68 microfarad.

An output stage 94 following the comparator 80 feeds, depending on the magnitude of the fault signal, either a red alarm lamp 95 or a green indicator lamp 96, which tells that the monitoring device 10' is operating. In addition to this visual indication, a transmitter for an acoustical warning signal can be connected to the line 15, or also a switch which, in the case of two high a fault signal, i.e., too low an insulation resistance of the neutron detector 3, automatically blocks the use of the useful signal.

Figure 4:
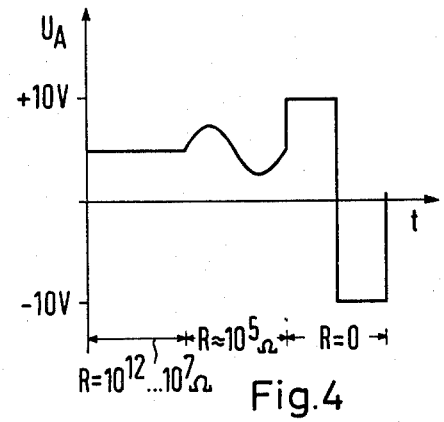
FIG. 4 graphically shows the interrelation between the amplifier output and the cable insulation resistance.

In FIG. 4, the interrelation between the output voltage of the operational amplifier 8 and the insulation resistance (37, 38, 39) of the neutron detector 3 is shown simplified in a rectangular coordinate system, the fault signal on the line 15 being plotted along the abscissa versus the ordinate used as the time axis. Here, the insulation resistance is varied in three steps ($10^{12}$ to $10^7$ ohm, $10^5$ ohm; 0 ohm) for a perid each of the modulation voltage, for the same neutron flux. From this it is seen that up to an insulation resistance of $10^7$ ohm, the useful signal is reproduced practically unfalsified, while at $10^5$ ohm an unequivocal determination of the fault condition is possible, while the d-c voltage value (mean value) characteristic of the useful signal does not become completely unusable. The square-wave curve for the zero value of the insulation resistance is a calculated (theoretical) limit value, which clearly demonstrates the possibility of monitoring by means of the a-c voltage modulation according to the invention.

FIG. 5 shows the neutron detector 3 and the connecting cable 4 in its physical form. The lines 40 and 41 are to be connected to the current amplifier 8 in FIG. 3 in the same way as is shown there with the equivalent circuit for detector 3 and cable 4. The sheath of the physical cable 4 is grounded.

What is claimed is:

1. A neutron detector arrangement comprising a neutron detector of the (n, e) process type, and a system comprising an operational current amplifier having an input and an input offset voltage adjustment circuit, a cable containing a conductor and insulation for the conductor, said cable connecting said detector to said input, a source of A-C current, connecting means for connecting said source to said circuit, said amplifier having an output, a cable insulation resistance-limit indicator, and filter means for filtering A-C current from said output and connecting the filtered output to said limit-indicator.

2. The neutron detector arrangement of claim 1 in which said source is a source of A-C current having a frequency of between 10 and 100 Hz.

3. The neutron detector arrangement of claim 1 in which said filter means is followed by a rectifier so that pulses are provided to said indicator.

4. The neutron detecting system of claim 1 in which said cable contains a compensating conductor connected to a second system corresponding to the aforesaid system but with said connecting means reversed so that the adjustment circuit of the corresponding amplifier of this second system is connected to said source oppositely phased relative to the connection thereto of the aforesaid adjustment circuit of said amplifier of the first-named system, means being provided for obtaining any difference between the outputs of the two said amplifiers.

* * * * *

UNITED STATES PATENT AND TRADEMARK OFFICE
CERTIFICATE OF CORRECTION

PATENT NO. : 3,982,131
DATED : September 21, 1976
INVENTOR(S) : Pierre Haller

It is certified that error appears in the above-identified patent and that said Letters Patent are hereby corrected as shown below:

Col. 2, line 62: change "International," to --International",--;

Col. 3, line 15: change "Fig. 2" to --Fig. 2,--;

Col. 3, line 30: change "8a to 8a" to --8a to 8f--;

Col. 4, line 45: change "Thus" to --Thus,--;

Col. 5, line 19: change "kohm" to --Kohm--.

Signed and Sealed this

Twenty-ninth Day of March 1977

[SEAL]

Attest:

RUTH C. MASON
Attesting Officer

C. MARSHALL DANN
Commissioner of Patents and Trademarks